United States Patent
Back

(10) Patent No.: US 7,304,965 B2
(45) Date of Patent: Dec. 4, 2007

(54) METHOD AND APPARATUS FOR GENERATING A CODE IN AN ASYNCHRONOUS CODE DIVISION MULTIPLE ACCESS MOBILE COMMUNICATION SYSTEM

(75) Inventor: Dae-Whan Back, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 757 days.

(21) Appl. No.: 10/720,115

(22) Filed: Nov. 25, 2003

(65) Prior Publication Data

US 2004/0160934 A1    Aug. 19, 2004

(30) Foreign Application Priority Data

Feb. 19, 2003    (KR) .................... 10-2003-0010353

(51) Int. Cl.
*H04B 7/212*  (2006.01)
*H04B 7/00*  (2006.01)
*H04L 9/00*  (2006.01)

(52) U.S. Cl. .................... 370/324; 370/310; 380/46

(58) Field of Classification Search ............... 370/324, 370/342

See application file for complete search history.

(56) References Cited

U.S. PATENT DOCUMENTS 7,106,690 B2 *   9/2006  Song .......................... 370/208
2002/0196936 A1 *  12/2002  Helper ......................... 380/46

* cited by examiner

*Primary Examiner*—Joseph Feild
*Assistant Examiner*—Kiet Doan
(74) *Attorney, Agent, or Firm*—Roylance, Abrams, Berdo & Goodman, L.L.P.

(57) ABSTRACT

A method and apparatus for generating a code in an asynchronous code division multiple access mobile communication system is provided. Specifically, the method and apparatus are for use in a transmitter in a mobile communication system which has multiple code groups having inherent code indices in response to each of slots, which selects one code group from among the multiple code groups, and which generates a second synchronization code corresponding to any one slot from among multiple slots, which are included in the selected code group. The method and apparatus determine position information designating a Hadamard code necessary for generating the second synchronization code by performing the steps of (1) in response to any one slot, outputting a value, which is obtained by subtracting 1 from a code index included in the selected code group, as a binary bit row; and (2) selecting one bit row, which employs the binary bit row as an upper bit and employs a binary code "0000" as a lower bit, as position information which designates the Hadamard code.

10 Claims, 5 Drawing Sheets

METHOD AND APPARATUS FOR GENERATING A CODE IN AN ASYNCHRONOUS CODE DIVISION MULTIPLE ACCESS MOBILE COMMUNICATION SYSTEM

PRIORITY

This application claims priority to an application entitled "Method and apparatus for generating code in asynchronous code division multiple access mobile communication system" filed in the Korean Industrial Property Office on Feb. 19, 2003 and assigned Serial No. 2003-10353, the contents of which are incorporated herein by reference.

BACKGROUND OF THE INVENTION

1. Field of the Invention

The present invention relates to a method and apparatus for generating a code in an asynchronous code division multiple access mobile communication system, and more particularly to a method and apparatus for generating a code in a synchronization channel for performing a cell search.

2. Description of the Related Art

In general, mobile communication systems can be classified into synchronous systems and asynchronous systems. The synchronous systems and the asynchronous systems classified above are respectively proposed by the United States of America and Europe. Presently, with the rapid growth of the mobile communication industry, next generation mobile communication systems, which can provide data and image services as well as typical voice services, have come to light and standardization is in progress with respect to the next-generation mobile communication systems. However, in the United States of America and Europe, which employ different mobile communication systems different standardizations are being developed. From among the next-generation mobile communication systems, the next-generation mobile communication system proposed in Europe is a third generation partnership project wideband code division multiple access (hereinafter, referred to as 3GPP W-CDMA) mobile communication system. Asynchronous operation is performed between base transceiver stations in the W-CDMA mobile communication system. Further, in order to classify the base transceiver stations, different scrambling codes are assigned. For instance, when an asynchronous base transceiver station system includes 512 cells, that is, 512 base transceiver stations, each of the 512 base transceiver stations uses a separate scrambling code from among the available 512 scrambling codes.

Also, in the W-CDMA mobile communication system as described above, a mobile station must know the scrambling code assigned to a base transceiver station which provides services to the mobile station. Accordingly, the mobile station confirms a scrambling code having the strongest signal from among the signals received from peripheral base transceiver stations. This is generally called a cell search process.

As described above, for a cell search, the mobile stations having the scrambling codes in the W-CDMA mobile communication system have used general cell search algorithms, which examine the phases of all assignable scrambling codes. However, in such general cell search algorithms, considerable time is necessary for cell search, thereby causing inefficiency.

In order to solve the problem, a multilevel cell search algorithm was proposed. In order to realize the multilevel cell search algorithm, first, 512 scrambling codes are divided into 64 code groups and then 8 scrambling codes are assigned to each code groups. Further, in order to facilitate cell search, a synchronization channel (hereinafter, referred to as SCH) and a common pilot channel (hereinafter, referred to as CPICH) are used. Herein, the SCH and the CPICH are signals provided from a base transceiver station to a mobile station through a forward link. The SCH is classified into a primary synchronization channel (hereinafter, referred to as P-SCH) and a second synchronization channel (hereinafter, referred to as S-SCH).

The multilevel cell search algorithm includes the following three cell search steps:

1) synchronizing a slot time in a slot, which is received at a maximum power, with the P-SCH transmitted from a base transceiver station;

2) when the time slot is synchronized through step 1, detecting a frame synchronization and a base transceiver station group designation code in the base transceiver station to which a mobile station belongs, by means of the S-SCH transmitted from the base transceiver station;

3) detecting a scrambling code in the base transceiver station by means of the CPICH, which is transmitted from the base transceiver station, on the basis of the frame synchronization and the base transceiver station group designation code searched in step 2, and finally searching a base transceiver station to which the mobile station belongs.

FIG. 1 is block diagram illustrating an example of a frame structure of a SCH and a CPICH used for cell search in a conventional W-CDMA system.

Referring to FIG. 1, one frame includes 15 slots. Herein, a P-SCH and a S-SCH are transmitted by (the unit of) a length as long as N (=256) chips at a starting portion in each slot and the P-SCH and the S-SCH are overlapped and transmitted and orthogonality is maintained between the two channels. In a CPICH, different scrambling codes are used according to base transceiver stations, and each of the scrambling codes has a period equal to a length of one frame. In the W-CDMA mobile communication system having a channel structure as described above, each of the different scrambling codes uses only one frame from a gold code row having a period of $2^{18}-1$ and only M (=512) number of codes from the entire usable gold codes.

All cells commonly use a first synchronization code $C_p$ utilized in the P-SCH, which is repeatedly transmitted at 256 chip interval corresponding to 1/10 of one slot in each slot. A mobile station uses the P-SCH for finding a slot timing in a received signal. That is, the mobile station receives the P-SCH and synchronizes a base transceiver station slot time by means of the first synchronization code $C_p$ (step 1).

A second synchronization code in a base transceiver station, that is, a base transceiver station group designation code $C_s^{i,1} \sim C_s^{i,15}$ is mapped and transmitted to the S-SCH. The mobile station, in which the time slot is synchronized by the P-SCH, detects a base transceiver station group designation code and a frame synchronization through the S-SCH. Herein, the base transceiver station group designation code is information for determining a cell group to which a base transceiver station belongs, and it uses a comma free code. The comma free code includes 64 code words and one code word includes 15 symbols. The 15 symbols are repeatedly transmitted at each frame. Herein, values of the 15 symbols are not just transmitted. Instead, the values of the 15 symbols are mapped to one second synchronization code from among the second synchronization code $C_s^{i,1}, \ldots, C_s^{i,15}$ and the mapped values are transmitted.

As shown in FIG. 1, an i-th second synchronization code corresponding to a symbol value 'i' for each slot is used as the second mapped synchronization code. The second synchronization code may be generally expressed by $C_s^{i,n}$. Herein, 'i' is an index which designates a scrambling code group and 'n' is an index which designates a random slot from among 15 slots included in one frame.

The 64 code words in the comma free code classifies 64 code groups. The comma free code has a characteristic in which a cyclic shift of each code word is unique. Accordingly, the second synchronization codes are correlated to each other with respect to the S-SCH during several slot intervals, and the correlated second synchronization codes are examined with respect to 64 code words and 15 cyclic shifts for each of the 64 code words, thereby obtaining information regarding a code group and a frame synchronization. Herein, the frame synchronization represents a synchronization with respect to a timing or a phase within one period in a scrambling spread code in a spread spectrum system. In the W-CDMA system, one period of a spread code and a frame length are 10 ms and which will be called_a frame synchronization (step 2).

Through steps 1 and 2 described above, the mobile station can obtain information regarding a slot synchronization, a base transceiver station group designation code and a frame synchronization by means of the P-SCH and the S-SCH. However, since the mobile station does not yet distinguish a scrambling code in a base transceiver station to which the mobile station belongs, from among eight scrambling codes in a code group in accordance with the obtained base transceiver station group designation code, a code synchronization is not completely implemented.

Accordingly, the mobile station correlates a pilot signal, which is received through a CPICH, with eight scrambling codes in the code group, so that the mobile station can distinguish a scrambling code, which will be used by the mobile station itself, from among eight scrambling codes (step 3).

As described above, for step 2, 15 second synchronization codes $C_s^{i,n}$ must be mapped to slots in a S-SCH by a transmitter in a base transceiver station and the mapped codes must be transmitted. Accordingly, a method and apparatus for generating the second synchronization codes $C_s^{i,n}$ must be proposed in the base transceiver station.

The second synchronization codes $C_s^{i,n}$ can be generated by the following equation 1.

$$Cs^{i,n} = (1+j) \times [H_m(0) \times z(0), \quad H_m(1) \times z(1), \quad H_m(2) \times z(2), \ldots, H_m(255) \times z(255)] \quad m = 16 \times (k-1) \quad \text{equation 1}$$

herein, 'k' represents a code index corresponding to n-th slot in i-th scrambling code group (Group i) and 'm' is a value determining a position of a Hadamard sequence.

As expressed by equation 1, in order to generate the second synchronization codes $C_s^{i,n}$, the Hadamard sequence $H_m$ must be determined. Further, in order to determine the Hadamard sequence $H_m$, 'm' determining the position of the Hadamard sequence must be first obtained. In equation 1, 'k' is defined as a parameter for determining m. An example of 'k', which is determined by 'i' and 'n' and determines 'm', is shown in table 1.

TABLE 1

| scrambling code group | #0 | #1 | #2 | #3 | #4 | #5 | #6 | #7 | #8 | #9 | #10 | #11 | #12 | #13 | #14 |
|---|---|---|---|---|---|---|---|---|---|---|---|---|---|---|---|
| Group 0  | 1 | 1  | 2  | 8  | 9  | 10 | 15 | 8  | 10 | 16 | 2  | 7  | 15 | 7  | 16 |
| Group 1  | 1 | 1  | 5  | 16 | 7  | 3  | 14 | 16 | 3  | 10 | 5  | 12 | 14 | 12 | 10 |
| Group 2  | 1 | 2  | 1  | 15 | 5  | 5  | 12 | 16 | 6  | 11 | 2  | 16 | 11 | 15 | 12 |
| Group 3  | 1 | 2  | 3  | 1  | 8  | 6  | 5  | 2  | 5  | 8  | 4  | 4  | 6  | 3  | 7  |
| Group 4  | 1 | 2  | 16 | 6  | 6  | 11 | 15 | 5  | 12 | 1  | 15 | 12 | 16 | 11 | 2  |
| Group 5  | 1 | 3  | 4  | 7  | 4  | 1  | 5  | 5  | 3  | 6  | 2  | 8  | 7  | 6  | 8  |
| Group 6  | 1 | 4  | 11 | 3  | 4  | 10 | 9  | 2  | 11 | 2  | 10 | 12 | 12 | 9  | 3  |
| Group 7  | 1 | 5  | 6  | 6  | 14 | 9  | 10 | 2  | 13 | 9  | 2  | 5  | 14 | 1  | 13 |
| Group 8  | 1 | 6  | 10 | 10 | 4  | 11 | 7  | 13 | 16 | 11 | 13 | 6  | 4  | 1  | 16 |
| Group 9  | 1 | 6  | 13 | 2  | 14 | 2  | 6  | 5  | 5  | 13 | 10 | 9  | 1  | 14 | 10 |
| Group 10 | 1 | 7  | 8  | 5  | 7  | 2  | 4  | 3  | 8  | 3  | 2  | 6  | 6  | 5  | 4  |
| Group 11 | 1 | 7  | 10 | 9  | 16 | 7  | 9  | 15 | 1  | 8  | 16 | 8  | 15 | 2  | 2  |
| Group 12 | 1 | 8  | 12 | 9  | 9  | 4  | 13 | 16 | 5  | 1  | 13 | 5  | 12 | 4  | 8  |
| Group 13 | 1 | 8  | 14 | 10 | 14 | 1  | 15 | 15 | 8  | 5  | 11 | 4  | 10 | 5  | 4  |
| Group 14 | 1 | 9  | 2  | 15 | 15 | 16 | 10 | 7  | 8  | 1  | 10 | 8  | 2  | 16 | 9  |
| Group 15 | 1 | 9  | 15 | 6  | 16 | 2  | 13 | 14 | 10 | 11 | 7  | 4  | 5  | 12 | 3  |
| Group 16 | 1 | 10 | 9  | 11 | 15 | 7  | 6  | 4  | 16 | 5  | 2  | 12 | 13 | 3  | 14 |
| Group 17 | 1 | 11 | 14 | 4  | 13 | 2  | 9  | 10 | 12 | 16 | 8  | 5  | 3  | 15 | 6  |
| Group 18 | 1 | 12 | 12 | 13 | 14 | 7  | 2  | 8  | 14 | 2  | 1  | 13 | 11 | 8  | 11 |
| Group 19 | 1 | 12 | 15 | 5  | 4  | 14 | 3  | 16 | 7  | 8  | 6  | 2  | 10 | 11 | 13 |
| Group 20 | 1 | 15 | 4  | 3  | 7  | 6  | 10 | 13 | 12 | 5  | 14 | 16 | 8  | 2  | 11 |
| Group 21 | 1 | 16 | 3  | 12 | 11 | 9  | 13 | 5  | 8  | 2  | 14 | 7  | 4  | 10 | 15 |
| Group 22 | 2 | 2  | 5  | 10 | 16 | 11 | 3  | 10 | 11 | 8  | 5  | 13 | 3  | 13 | 8  |
| Group 23 | 2 | 2  | 12 | 3  | 15 | 5  | 8  | 3  | 5  | 14 | 12 | 9  | 8  | 9  | 14 |
| Group 24 | 2 | 3  | 6  | 16 | 12 | 16 | 3  | 13 | 13 | 6  | 7  | 9  | 2  | 12 | 7  |
| Group 25 | 2 | 3  | 8  | 2  | 9  | 15 | 14 | 3  | 14 | 9  | 5  | 5  | 15 | 8  | 12 |
| Group 26 | 2 | 4  | 7  | 9  | 5  | 4  | 9  | 11 | 2  | 14 | 5  | 14 | 11 | 16 | 16 |
| Group 27 | 2 | 4  | 13 | 12 | 12 | 7  | 15 | 10 | 5  | 2  | 15 | 5  | 13 | 7  | 4  |
| Group 28 | 2 | 5  | 9  | 9  | 3  | 12 | 8  | 14 | 15 | 12 | 14 | 5  | 3  | 2  | 15 |
| Group 29 | 2 | 5  | 11 | 7  | 2  | 11 | 9  | 4  | 16 | 7  | 16 | 9  | 14 | 14 | 4  |
| Group 30 | 2 | 5  | 2  | 13 | 3  | 3  | 12 | 9  | 7  | 16 | 6  | 9  | 16 | 13 | 12 |
| Group 31 | 2 | 6  | 9  | 7  | 7  | 16 | 13 | 3  | 12 | 2  | 13 | 12 | 9  | 16 | 6  |
| Group 32 | 2 | 7  | 12 | 15 | 2  | 12 | 4  | 10 | 13 | 15 | 13 | 4  | 5  | 5  | 10 |
| Group 33 | 2 | 7  | 14 | 16 | 5  | 9  | 2  | 9  | 16 | 11 | 11 | 5  | 7  | 4  | 14 |
| Group 34 | 2 | 8  | 5  | 12 | 5  | 2  | 14 | 14 | 8  | 15 | 3  | 9  | 12 | 15 | 9  |

TABLE 1-continued

| scrambling code group | slot number | | | | | | | | | | | | | | |
|---|---|---|---|---|---|---|---|---|---|---|---|---|---|---|---|
| | #0 | #1 | #2 | #3 | #4 | #5 | #6 | #7 | #8 | #9 | #10 | #11 | #12 | #13 | #14 |
| Group 35 | 2 | 9 | 13 | 4 | 2 | 13 | 8 | 11 | 6 | 4 | 6 | 8 | 15 | 15 | 11 |
| Group 36 | 2 | 10 | 3 | 2 | 13 | 16 | 8 | 10 | 8 | 13 | 11 | 11 | 16 | 3 | 5 |
| Group 37 | 2 | 11 | 15 | 3 | 11 | 6 | 14 | 10 | 15 | 10 | 6 | 7 | 7 | 14 | 3 |
| Group 38 | 2 | 16 | 4 | 5 | 16 | 14 | 7 | 11 | 4 | 11 | 14 | 9 | 9 | 7 | 5 |
| Group 39 | 2 | 3 | 4 | 6 | 11 | 12 | 13 | 6 | 12 | 14 | 4 | 5 | 13 | 5 | 14 |
| Group 40 | 2 | 3 | 6 | 5 | 16 | 9 | 15 | 5 | 9 | 10 | 6 | 4 | 15 | 4 | 10 |
| Group 41 | 2 | 4 | 5 | 14 | 4 | 6 | 12 | 13 | 5 | 13 | 6 | 11 | 11 | 12 | 14 |
| Group 42 | 2 | 4 | 9 | 16 | 10 | 4 | 16 | 15 | 3 | 5 | 10 | 5 | 15 | 6 | 6 |

Accordingly, 'm' reads 'k' corresponding to a particular slot in a desired scrambling code group through table 1, and 'm' is determined by 'k'.

Also, in equation 1, the second synchronization codes $C_s^{i,n}$ are generated by the Hadamard sequence $H_m$ according to the value m, which determines the position of the Hadamard sequence, and a 'z-sequence'. The Hadamard sequence $H_m$ required for generating the second synchronization codes $C_s^{i,n}$ is generated through a matrix shown in equation 2 and the z-sequence is generated through equation 3.

$$H_m = \begin{bmatrix} H_{m-1} & H_{m-1} \\ H_{m-1} & -H_{m-1} \end{bmatrix}, m \geq 1 \quad \text{equation 2}$$

$$z = <b,b,b,-b,b,b,-b,-b,b,-b,b,-b,-b,-b,-b,-b,> \quad \text{equation 3}$$

As expressed by equation 3, the z-sequence includes a 'b-sequence'. The b-sequence is defined by equation 4.

$$b = <x_1,x_2,x_3,x_4,x_5,x_6,x_7,x_8,x_8,-x_9,-x_{10},-x_{11},-x_{12},-x_{13},-x_{14},-x_{15},-x_{16}> \quad \text{equation 4}$$

herein, x has the same value as that of 'a-sequence' expressed by equation 5.

$$a = <x_1,x_2,x_3,\ldots,x_{16}> = <1,1,1,1,1,1,-1,-1,1,-1,1,-1,1,-1,-1,1> \quad \text{equation 5}$$

The a-sequence expressed by equation 5 is also used for generating codes utilized in a P-SCH.

For instance, when it is assumed that 'i' is zero and 'n' is three, 'k' is determined as eight through table 1, and therefore 'm' becomes 112 computed by 16×(8−1). The value '112' is put into the matrix expressed by equation 2, thereby generating a Hadamard sequence corresponding to the value '112'. When the Hadamard sequence is generated, the generated Hadamard sequence and the z-sequence are applied to equation 1, so that a second synchronization code in a fourth slot in a first scrambling code group Group 0 is generated.

FIG. 2 is a block diagram showing a construction of an apparatus for generating the Hadamard sequence required for generating the second synchronization code as described above.

Referring to FIG. 2, a digital signal processor (not shown) determines a scrambling code group 'Group i', which will be used, and records code index values according to each slot, which correspond to the determined scrambling code group 'Group i', in a register 210. The code index values may be expressed by 5 bits and one example of the code index values is shown in table 1. As shown in table 1, a maximum value in each scrambling code group is 16 and 5 bits is necessary for expressing the value using a binary code. The register 210 outputs code index values according to each slot, which are recorded by the digital signal processor, at a particular point in time. A multiplexer 220 receives a slot count value SCH_Slot_Cnt[3:0] determining a slot position and selects/outputs one index value 'k' from among 15 code index values provided from the register 210, by means of the slot count value SCH_Slot_Cnt[3:0]. The slot count value SCH_Slot_Cnt[3:0] represents a slot position for generation of a second synchronization code. 5 bits 'k' output from the multiplexer 220 is input to a subtracter 240 through a buffer 230. The subtracter 240 subtracts one from 'k' and provides 'k−1' to a multiplier 250. The multiplier 250 multiplies 'k−1' by 16 and stores 'm', which results from the multiplication, in a buffer 260. The buffer 260 storing 'm' has a length of eight. An operation by the subtracter 240 and the multiplier 250 is equal to an equation "16×(k−1)" for obtaining 'm'.

The value 'm' stored in the buffer 260 is transmitted to a code generator 270. The code generator 270 receives 'm' and then outputs a Hadamard sequence for generating a second synchronization code which will be transmitted through the desired slot. That is, the code generator 270 applies 'm' to equation 2, thereby generating the Hadamard sequence. The Hadamard sequence generated as described above is multiplied by a 'z-sequence', thereby generating a desired second synchronization code.

As described above, in order to generate the conventional second synchronization code, a code index corresponding to each slot is expressed by 5 bits. Accordingly, in order to store the code index, a 5 bits register including 16 areas is necessary. Further, a subtracter and a multiplier must be used for computing 'm', thereby increasing the difficulty in constructing an apparatus for generating the second synchronization code. Furthermore, this results in an increase in hardware size when a synchronization channel in a transmitter in a base transceiver station also increases.

SUMMARY OF THE INVENTION

Accordingly, the embodiments of the present invention solve problems occurring in the conventional systems, and an object of the present invention is to provide an apparatus for generating a second synchronization code, which can decrease the complexity and size of hardware used.

Another object of the present invention is to provide a method and apparatus for generating a second synchronization code, in which different indices in each slot, which determine code generation in a second synchronization channel, have been modified to facilitate construction of hardware.

A Further object of the present invention is to provide a method and apparatus for converting a 5 bits code index value 'k' into that of 4 bits, and determining a bit row, in which the 4 bit code index 'k' is combined with "0000", as 'm'.

In order to substantially accomplish the aforementioned objects, according to an embodiment of the present, there is provided a method employed in a transmitter in a mobile communication system which has multiple code groups which have inherent code indices in response to slots, selects one code group from among the multiple code groups, and generates a second synchronization code corresponding to any one slot from among multiple slots, which are included in the selected code group, the method comprises the steps of (1) in response to any one slot, outputting a value, which is obtained by subtracting 1 from a code index included in the selected code group, as a binary bit row; and (2) selecting one bit row, which employs the binary bit row as an upper bit and employs a binary code "0000" as a lower bit, as position information which designates the Hadamard code.

In order to substantially accomplish the aforementioned objects, according to an embodiment of the present, there is provided an apparatus employed in a transmitter in a mobile communication system which has multiple code groups which have inherent code indices in response to slots, selects one code group from among the multiple code groups and generates a second synchronization code corresponding to any one slot from among multiple slots which included in the selected code group, an apparatus for determining position information designating a Hadamard code necessary for generating the second synchronization code. The apparatus comprises a register for temporarily storing binary bit rows of 4 bits obtained by subtracting 1 from inherent indices corresponding to each of slots included in the selected code group; a multiplexer for selecting and outputting any one binary bit row from among the temporarily stored binary bit rows by means of a slot count value; and a buffer for outputting one bit row, which employs the binary bit row from the multiplexer as an upper bit and employs a binary code "0000" as a lower bit, as position information which designates the Hadamard code.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, an embodiment according to the present invention will be described with reference to the accompanying drawings.

The embodiment of the present invention, which will be described, proposes not only a method and an apparatus for generating a Hadamard sequence required for generating a second synchronization code, but also a method and an apparatus for generating a second synchronization code, which employs the Hadamard sequence as an input. Herein, an index value 'm' determining a position of the Hadamard sequence is necessary for generating the Hadamard sequence, and the embodiment of the present invention proposes a method and an apparatus for generating the Hadamard sequence. That is, the embodiment proposes a method and an apparatus for converting an existing 5 bit code index value 'k' bits into that of 4 bits and then employing a bit row, in which the 4 bit code index value 'k' is combined with "0000", as the value 'm'. Herein, the 4 bit code index value 'k' is called an upper bit and "0000" combined with the 4 bit code index value 'k' is called a lower bit. Accordingly, 'm' has a structure of "$k_3, k_2, k_1, k_0, 0, 0, 0, 0$".

Figure 1:
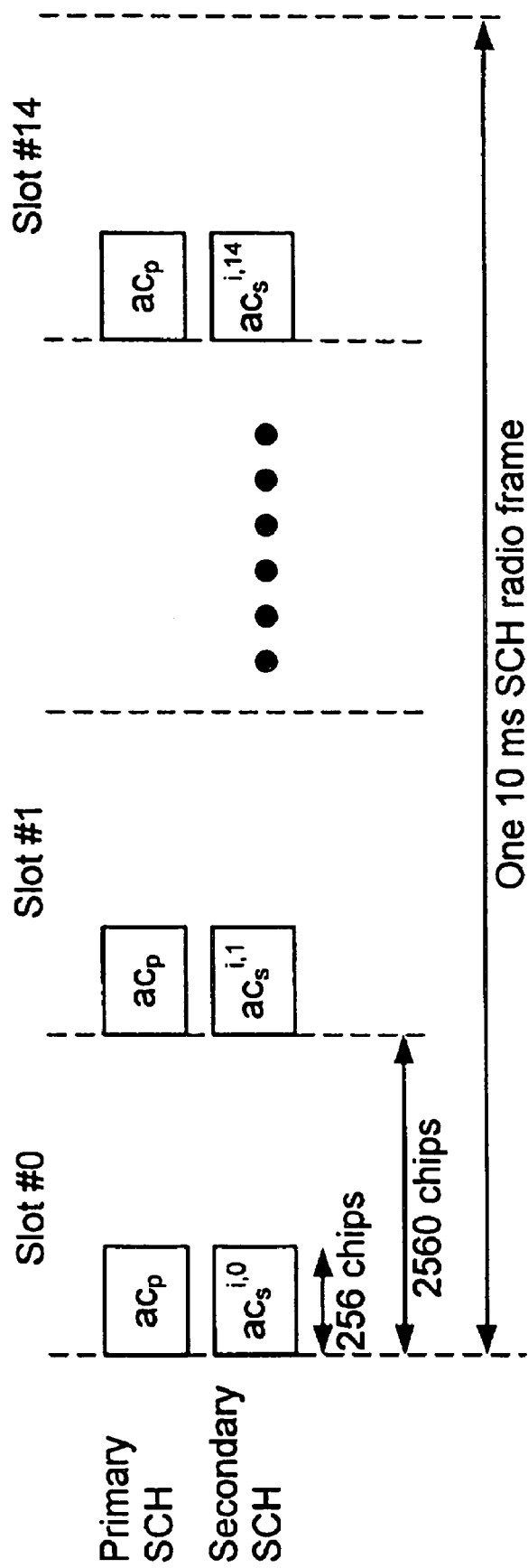
FIG. 1 is a diagram illustrating a frame structure in a synchronization channel (SCH) and a common pilot channel (CPICH) used for searching for cells in a conventional wideband code division multiple access (W-CDMA) system.
Figure 2:
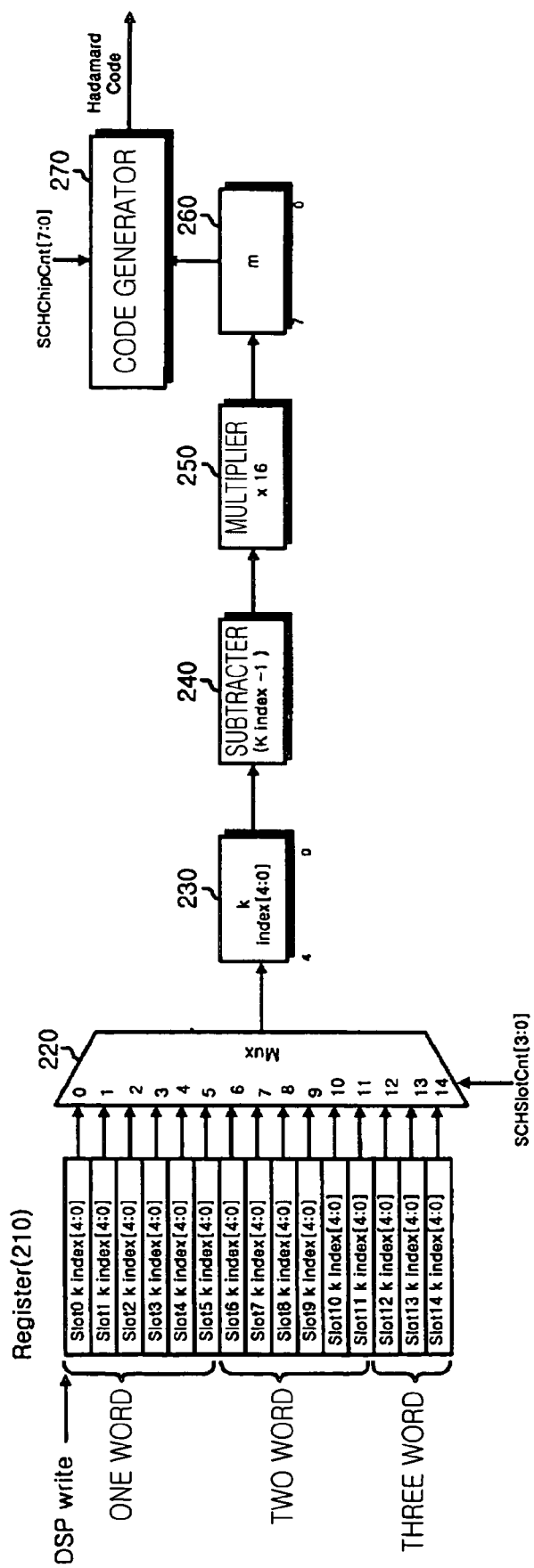
FIG. 2 is a block diagram illustrating a construction of an apparatus for generating a Hadamard sequence required for generating a conventional second synchronization code.
Figure 3:
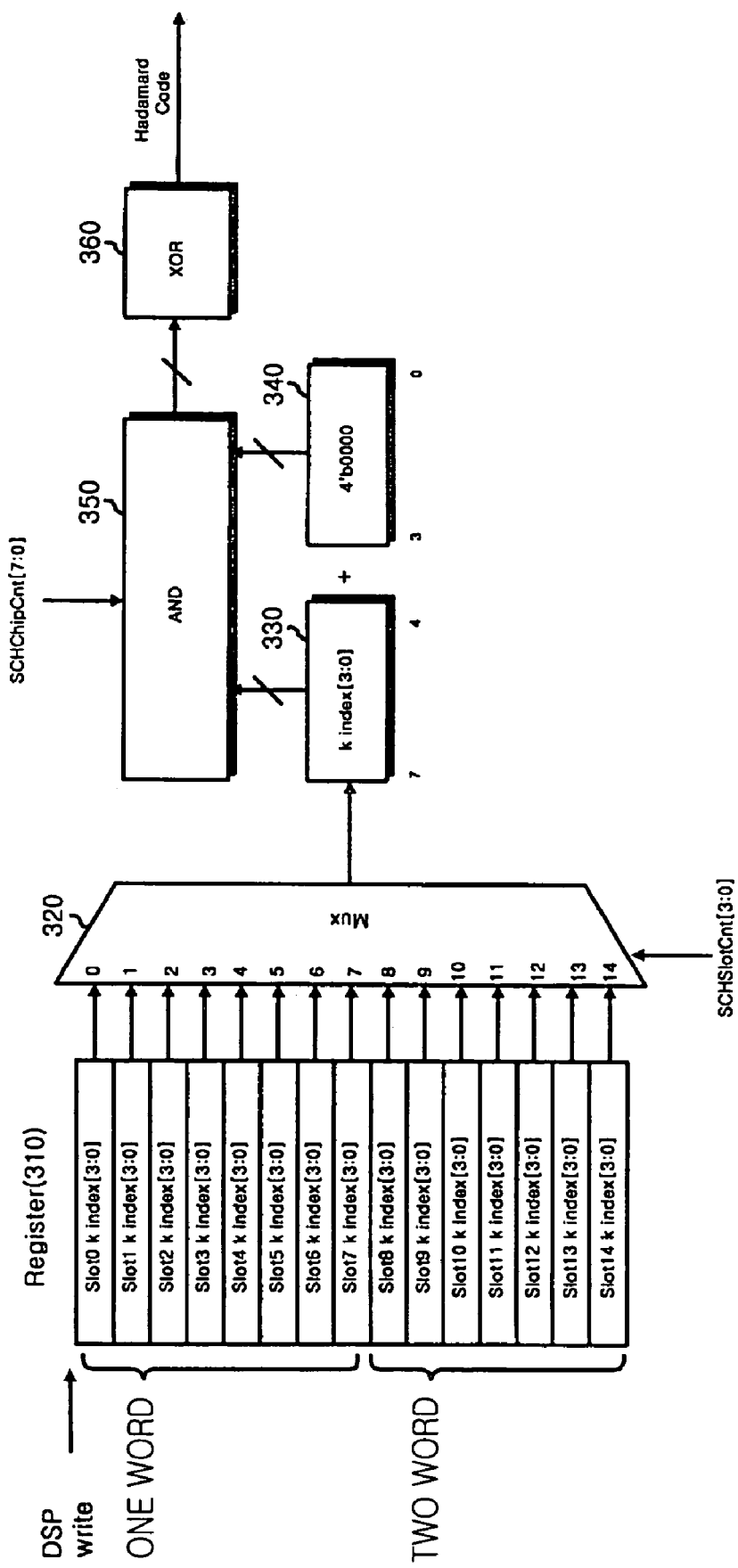
FIG. 3 is a block diagram illustrating a construction of an apparatus for generating a Hadamard sequence required for generating a second synchronization code according to an embodiment of the present invention.

FIG. 3 is a block diagram illustrating a construction of an apparatus for generating a Hadamard sequence required for generating a second synchronization code according to an embodiment of the present invention.

Referring to FIG. 3, a digital signal processor (not shown) determines a scrambling code group 'Group I', which will be used, and it records code index values according to each of 15 slots, which correspond to the determined scrambling code group 'Group i', in a register 310. The code index values are values obtained by subtracting 1 from each of the code index values shown in table 1. One example of the code index values recorded in the register 310 is shown in table 2 which shows 4 bit code index values with respect to Group 0.

TABLE 2

| scrambling code group | slot number | | | | | | | | | | | | | | |
|---|---|---|---|---|---|---|---|---|---|---|---|---|---|---|---|
| | #0 | #1 | #2 | #3 | #4 | #5 | #6 | #7 | #8 | #9 | #10 | #11 | #12 | #13 | #14 |
| Group 0 (before modification) | 1 | 1 | 2 | 8 | 9 | 10 | 15 | 8 | 10 | 16 | 2 | 7 | 15 | 7 | 16 |
| Group 0 (after modification) | 0 | 0 | 1 | 7 | 8 | 9 | 14 | 7 | 9 | 15 | 1 | 6 | 14 | 6 | 15 |

As shown in table 2, a maximum value from among code index values with respect to Group 0 after modification is 15. Therefore 15 code index values according to each scrambling code group can be expressed by a 4 bit binary code. Accordingly, in the register 310, an area storing code index values according to each slot has a size of 4 bits. Meanwhile, 5 bit code index value is converted into that of 4 bits, so that the DSP may record 4 bit code index values instead of recording 5 bit code index value.

The register 310 simultaneously outputs code index values according to each slot, which are recorded by the digital signal processor, at a particular point in time. A multiplexer 320 receives a slot count value SCH_Slot_Cnt[3:0] designating one slot from among 15 slots and selects/outputs one code index value 'k' from among 15 code index values provided from the register 310, by means of the slot count value SCH_Slot_Cnt[3:0]. The code index value 'k' from the multiplexer 320 is recorded in a first buffer 330. Since the code index value 'k' includes 4 bits, the first buffer 330 has a size of 4 bits. A second buffer 340 records additional bits "0000". A bit row of 8 bits, in which 'k' recorded in the first buffer 330 is combined with the additional bits recorded in the second buffer 340, is an index value 'm' determining a position of a Hadamard sequence expressed by "16×(k−1)". It should be appreciated by those skilled in the art that the first buffer 330 and the second buffer 340 can be constructed using one buffer as opposed to two separate buffers as shown in FIG. 3 without departing from the scope of the present invention. When the first buffer 330 and the second buffer 340 are constructed using one buffer, an area recording 'k' is an upper bit recording area and an area recording the additional bits "0000" is a lower bit recording area.

An AND operation unit 350 receives 4 bit 'k' from the first buffer 330 and the additional bits "0000" from the second buffer 340. The AND operation unit 350 performs a logical AND operation on 'm', in which 'k' is combined with the additional bits, and an 8 bit chip count value SCHChipCnt[7:0] by the unit of bit, thereby producing an 8 bit sequence in the unit of chip, and then outputs the produced 8 bit sequence to an XOR operation unit 360. The chip count value SCHChipCnt [7:0] is a value of 8 bits provided by a counter counting 256 chips, which is a second synchronization code, transmitted according to 15 slots included in one frame. That is, when the slot count value SCHSlotCnt [3:0] increases by one, the chip count value SCHChipCnt [7:0] counts from one to 255. Accordingly, the AND operation unit 350 sequentially performs a logical AND operation on the binary codes from zero to 255 according to corresponding bits to each 'm', which is provided from the first buffer 330 and the second buffer 340, and then outputs the operation result. As a result, the AND operation unit 350 finally outputs 256 sequences with respect to one 'm'. Each of the sequences is a bit row of 8 bits. The XOR operation unit 360 performs a logical XOR operation on the 8 bits output from the AND operation unit 350 and outputs 1 bit. Further, the XOR operation unit 360 outputs the one bit 256 times in the same method as described above and then outputs a Hadamard sequence which results from the output.

For instance, when 'm' has a value of '10111011' and SCHChipCnt has a value of '11000101', '10000001' can be obtained as the 8 bits by performing a logical AND operation according to each bit. When '10000001' is input to the XOR operation unit 360, the XOR operation unit 360 performs a logical XOR operation on all 8 bits, and therefore the result is zero. The operation repeats 256 times. Herein, the XOR operator generates one when the number of '1's is odd from among input variables and generates zero when the number of '1's is even from among input variables. Accordingly, in the output '10000001' of the logical AND operation, since the number of '1's is even, the result is zero.

Figure 4:
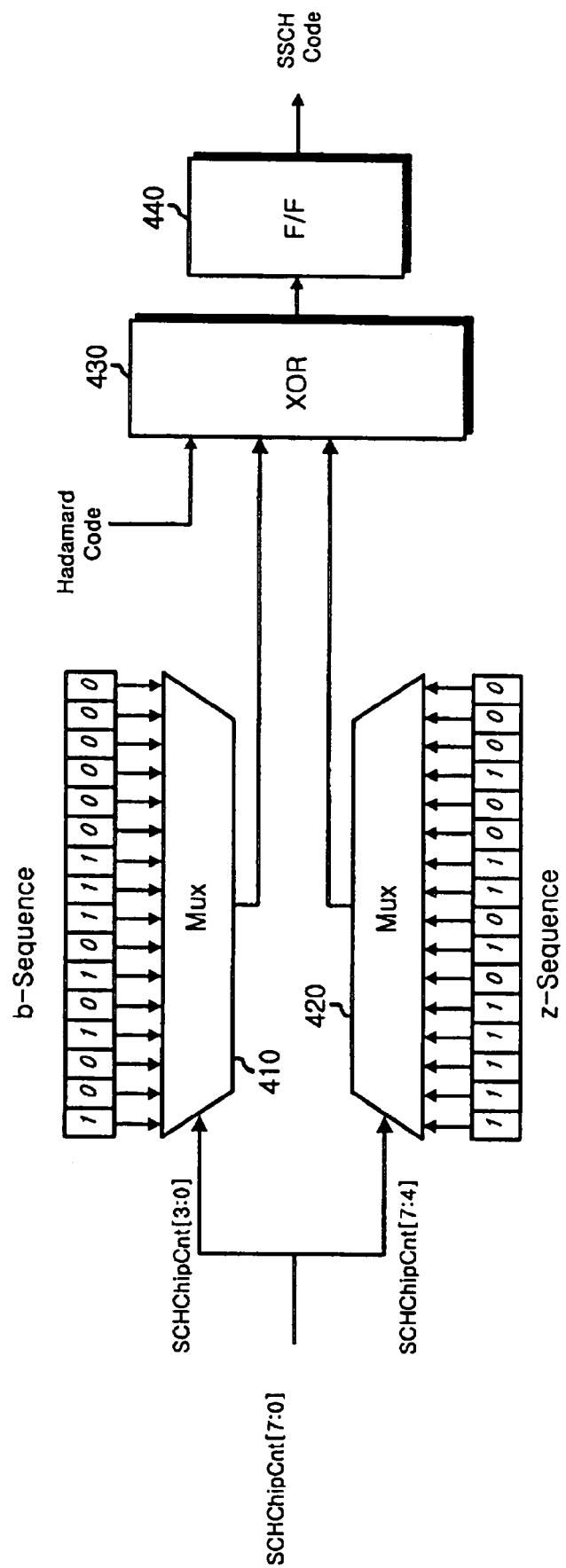
FIG. 4 is a block diagram illustrating a construction for generating a second synchronization code according to an embodiment of the present invention.

FIG. 4 is block diagram illustrating a construction for generating a second synchronization code according to an embodiment of the present invention.

Referring to FIG. 4, a lower four bit SCHChipCnt [3:0] from the chip count value SCHChipCnt [7:0] is input to a first multiplexer (hereinafter, referred to as first MUX) 410 and an upper four bit SCHChipCnt [7:4] from the chip count value SCHChipCnt [7:0] is input to a second multiplexer (hereinafter, referred to as second MUX) 420. The first MUX 410 receives a 'b-sequence' and selects/outputs one bit from among 15 bits included in the b-sequence by means of the lower four bit SCHChipCnt [3:0]. As defined by equation 4, the b-sequence may be expressed by an 'a-sequence'. Also, the a-sequence is defined by <1,1,1,1,1,1,−1,−1,1,−1,1,−1,1,−1,−1,1> in equation 5. The a-sequence is expressed by <0, 0, 0, 0, 0, 0, 1, 1, 0, 1, 0, 1, 0, 1, 0, 1, 1, 0> by means of a binary code, and the a-sequence expressed by the binary code is applied to equation 4, thereby obtaining a 'b-sequence' expressed by <0, 0, 0, 0, 0, 0, 1, 1, 1, 0, 1, 0, 1, 0, 0, 1>. A 'b-sequence' arranged in reverse sequence is input to the first MUX 410. That is, the b-sequence expressed by <1, 0, 0, 1, 0, 1, 0, 1, 1, 1, 0, 0, 0, 0, 0, 0> is input to the first MUX 410, and <1, 0, 0, 1, 0, 1, 0, 1, 1, 1, 0, 0, 0, 0, 0, 0> corresponds to <−$x_{16}$, −$x_{15}$, −$x_{14}$, −$x_{13}$, −$x_{12}$, −$x_{11}$, −$x_{10}$, −$x_9$, $x_8$, $x_7$, $x_6$, $x_5$, $x_4$, $x_3$, $x_2$, $x_1$>. The second MUX 420 receives a 'z-sequence' and selects/outputs one bit from among 15 bits included in the z-sequence by means of the lower four bit SCHChipCnt [7:4]. Accordingly, the second MUX 420 selects a next bit when the first MUX 410 selects all bits. This may be a construction for meeting equation 3. The XOR operation unit 430 performs a logical XOR operation on two bits, which are respectively output from the first MUX 410 and the second MUX 420 by the chip count value SCHChipCnt [7:0], and a bit row of 8 bits, which are output through the construction in FIG. 3 by the unit of chip, by the unit of bit, and it outputs the operated result. The bit row, which is output from the XOR operation unit 430 by the unit of 8 bits by means of the chip count value SCHChipCnt [7:0], corresponds to one chip in a second synchronization code of 256 chips corresponding to a desired slot. Also, a sequence from the XOR operation unit 430 may be output by a flip-flop 440 by the unit of chip or 256 chips.

Figure 5:
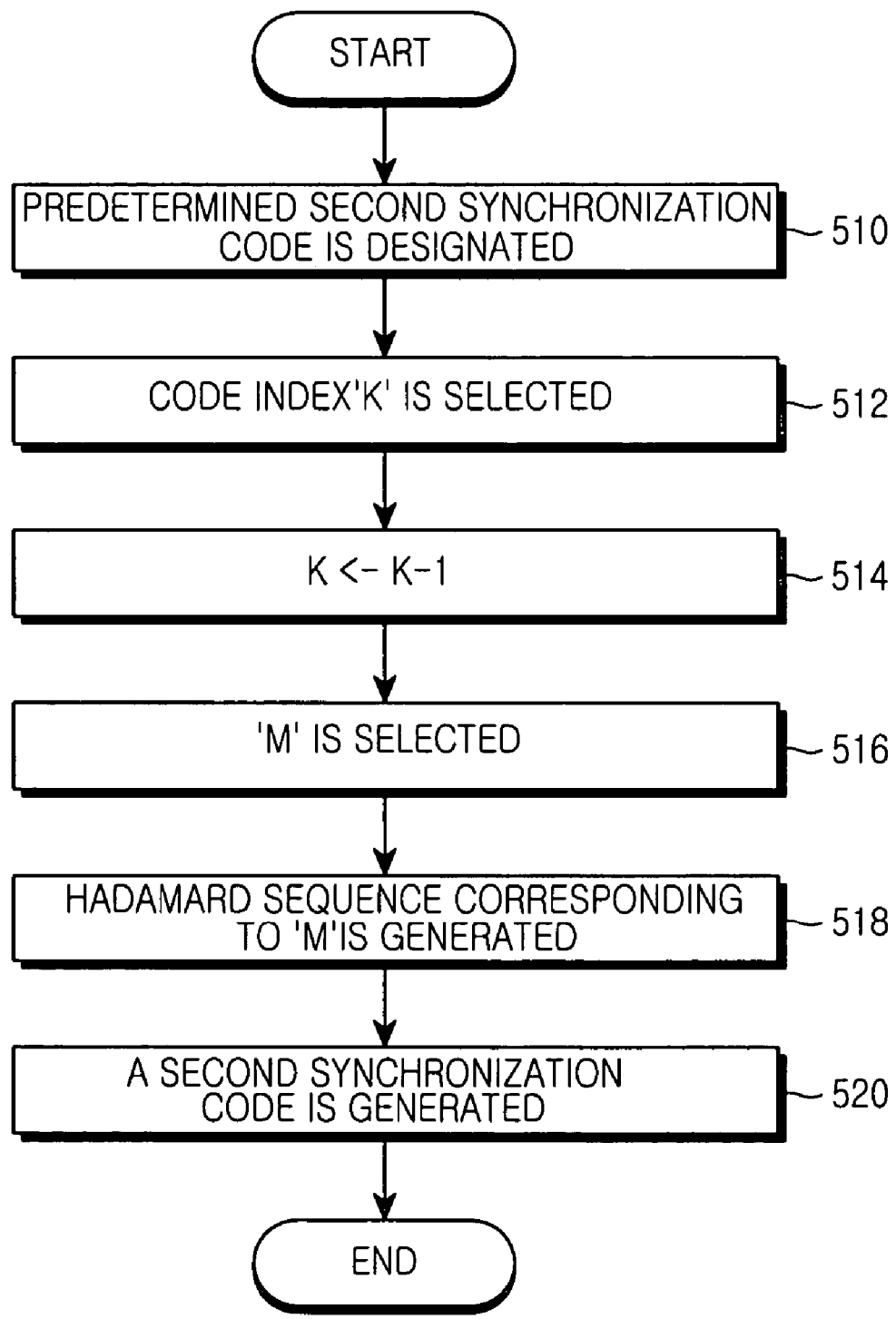
FIG. 5 is a flowchart illustrating a control flow for generating a second synchronization code according to an embodiment of the present invention.

FIG. 5 is a flowchart illustrating a control flow for generating a second synchronization code according to an embodiment of the present invention. In FIG. 5, steps 510 to 516 correspond to a construction for generating 'm' in FIG. 3 and step 518 corresponds to a construction for generating a Hadamard sequence by means of 'm' in FIG. 3. A step 520 in FIG. 5 corresponds to a construction in FIG. 4 for generating a desired second synchronization code by means of a Hadamard sequence.

Referring to FIG. 5, in step 510, a predetermined second synchronization code is designated. As a result of the designation, a predetermined scrambling code group and one slot from among 15 slots corresponding to the scrambling code group are selected. When the second synchronization code is designated, a code index 'k' corresponding to one slot is selected from among the slots in the scrambling code group in response to the second synchronization code in step 512. In step 514, a new 'k' is obtained by subtracting 1 from the selected code index 'k' and. In step 516, 'm' is selected which employs 'k' as an upper bit and employs '0000' as a lower bit. Then, step 518 is performed. That is, a Hadamard sequence corresponding to the selected 'm' is generated. In step 520, a second synchronization code, which will be transmitted, is generated through a corresponding slot in the scrambling code group by means of the generated Hadamard sequence.

Hereinafter, an operation according to an embodiment of the present invention will be in detail described with reference to drawings described above.

First, an operation for generating a Hadamard sequence will be described with reference to FIG. 3. an operation DSP selects a predetermined scrambling code group and outputs 4 bit code index values corresponding to each of 15 slots in the selected scrambling code group. The 4 bit code index values are values obtained by subtracting 1 from each of code index values shown in table 1. Each of the 4 bit code index values is recorded in a corresponding recording area from among 15 recording areas in a register 310. The 15 code index values recorded in the register 310 are output at the same point in time and one code index from 15 code indices is selected and output by the multiplexer 320 employing the slot count value SCH_Slot_Cnt [3:0] as an input value. Herein, the slot count value SCH_Slot_Cnt [3:0] is a value counted by a counter (not shown) operating at each slot in the selected scrambling code group. That is, the multiplexer 320 selects a code index corresponding to a slot, which wants to generate a second synchronization code, from among 15 slots in a scrambling code group which will be used. The code index output from the multiplexer 320 is 4 bits and recorded as 'k index[3:0]' in the first buffer 330. This is used as an upper bit of 'm' necessary for generating Hadamard sequence and 4 bits recorded in the second buffer 340 is used as lower bits of 'm'. The 4 bits recorded in the second buffer 340 is "0000". 8 bit 'm', in which the upper bit is combined with the lower bit, is provided to the AND operation unit 350. Then, the AND operation unit 350 performs a logical AND operation on 'm' and a chip count value SCHChipCnt [7:0] by the unit of bit. One example of sequences output from the AND operation unit 350 is shown in table 3.

TABLE 3

| m | SCHChipCnt[7:0] | AND |
|---|---|---|
| K$_3$, k$_2$, k$_1$, k$_0$, 0, 0, 0, 0 | 00000000 | 0, 0, 0, 0, 0, 0, 0, 0 |
| | 00000001 | 0, 0, 0, 0, 0, 0, 0, 0 |
| | 00000010 | 0, 0, 0, 0, 0, 0, 0, 0 |
| | 00000011 | 0, 0, 0, 0, 0, 0, 0, 0 |
| | 00000100 | 0, 0, 0, 0, 0, 0, 0, 0 |
| | . | . |
| | . | . |
| | . | . |
| | 01101111 | 0, k$_2$, k$_1$, 0, 0, 0, 0, 0 |
| | 01110000 | 0, k$_2$, k$_1$, k$_0$, 0, 0, 0, 0 |
| | . | . |
| | . | . |
| | . | . |
| | 11111100 | K$_3$, k$_2$, k$_1$, k$_0$, 0, 0, 0, 0 |
| | 11111101 | K$_3$, k$_2$, k$_1$, k$_0$, 0, 0, 0, 0 |
| | 11111110 | K$_3$, k$_2$, k$_1$, k$_0$, 0, 0, 0, 0 |
| | 11111111 | K$_3$, k$_2$, k$_1$, k$_0$, 0, 0, 0, 0 |

The sequences, which are output from the AND operation unit 350, are input to the XOR operation unit 360. Then, the XOR operation unit 360 performs a logical XOR operation on all of the 8 bit sequences, thereby outputting a final Hadamard sequence. Accordingly, 256 sequences of 8 bits are generated as the final Hadamard sequence in response to one 'm' and 256 sequences represent 256 chips. The Hadamard sequence of 256 chips may be expresses by "$H_m(0)$, $H_m(1)$, $H_m(2)$, . . . ,$H_m(255)$".

Hereinafter, 'm' will be obtained by means of the first scrambling code group 'Group #0' and the fourth slot #3, as an example.

The operation DSP reads 15 code index values "1, 1, 2, 8, 9, 10, 15, 8, 10, 16, 2, 7, 15, 7, 16", which are recorded in each slot in the 'Group #0', from table 1. Further, the operation DSP records code index values "0, 0, 1, 7, 8, 9, 14, 7, 9, 15, 1, 6, 14, 6, 15", which are obtained by substracting 1 from each of the read code index values, according to a corresponding recording area in the register 310. The code index values before modification and the code index values after modification are shown in table 2. The values recorded in the register 310 are binary code values which convert the code index values, which are obtained by subtracting 1, into binary codes. For instance, 7 is converted into "0111" and the converted value is recorded. Further, 15 is converted into "1111" and the converted value is recorded. The 15 code index values recorded as the binary code in the register 310 are input to the multiplexer 320. Further, a slot count value "0011" selecting the fourth slot #3 is input to the multiplexer 320. Accordingly, the multiplexer 320 outputs a code index value "0111" corresponding to the fourth slot from among the 15 code index values. The output code index value "0111" is recorded in the first buffer 330. The "0111" recorded in the first buffer 330 is combined with "0000" recorded in the second buffer 340. From the result of the combination, "01110000" is obtained and then input to the AND operation unit 350. The "01110000" input to the AND operation unit 350 becomes the index value 'm' which determines a position of a Hadamard sequence. The 'm' obtained by the example described above has the same value as that of 'm' computed by the conventional "16×(k−1)". That is, in the aforementioned example, since it is assumed that 'k' is 8, 'm' has a value of 112 according to the conventional method. The value of 112 is expressed by "01110000" by means of an 8 bit binary code, and "01110000" is the same as 'm' according to a method proposed in the present invention.

Next, an operation for generating a second synchronization code will be described with reference to FIG. 4. 16 bit b-sequence is input to the first MUX 410 and 16 bit z-sequence is input to the second MUX 420. The first MUX 410 outputs one bit '$b_{out}$', which is selected by lower 4 bits SCHChipCnt [3:0] from among an 8 bit chip count value SCHChipCnt [7:0], from 16 bit b-sequence. The second MUX 420 outputs one bit '$z_{out}$', which is selected by upper 4 bits SCHChipCnt [7:4] from among the 8 bit chip count value SCHChipCnt [7:0], from 16 bit z-sequence.

An input/output relation between the first MUX 410 and the second MUX 420 is shown in table 4.

TABLE 4

| SCHChipCnt [7:0] | b-sequence | z-sequence | b$_{out}$ | z$_{out}$ |
|---|---|---|---|---|
| 0000 0000 | b$_{16}$, b$_{15}$, b$_{14}$, | z$_{16}$, z$_{15}$, z$_{14}$, | b$_1$ | z$_1$ |
| 0000 0001 | b$_{13}$, b$_{12}$, b$_{11}$, | z$_{13}$, z$_{12}$, z$_{11}$, | b$_2$ | z$_1$ |
| 0000 0010 | b$_{10}$, b$_9$, b$_8$, b$_7$, | z$_{10}$, z$_9$, z$_8$, z$_7$, | b$_3$ | z$_1$ |
| . | b$_6$, b$_5$, b$_4$, b$_3$, | z$_6$, z$_5$, z$_4$, z$_3$, | . | . |
| . | b$_2$, b$_1$ | z$_2$, z$_1$ | . | . |
| 0000 1111 | | | b$_{16}$ | z$_1$ |
| 0001 0000 | | | b$_1$ | z$_2$ |
| 0001 0001 | | | b$_2$ | z$_2$ |

TABLE 4-continued

| SCHChipCnt [7:0] | b-sequence | z-sequence | $b_{out}$ | $z_{out}$ |
|---|---|---|---|---|
| . | | | . | . |
| . | | | . | . |
| 0001 1111 | | | $b_{16}$ | $z_2$ |
| 0010 0000 | | | $b_1$ | $z_3$ |
| 0010 0001 | | | $b_2$ | $z_3$ |
| . | | | . | . |
| . | | | . | . |
| 1111 1111 | | | $b_{16}$ | $z_{16}$ |

As shown in table 4, each bit in the b-sequence is sequentially selected by the lower 4 bits in the chip count value SCHChipCnt [7:0] and each bit in the z-sequence is sequentially selected by the upper 4 bits in the chip count value SCHChipCnt [7:0]. Accordingly, the number of combinations of bits output from the first MUX 410 and the second MUX 420 is 256. In table 4, the b-sequence $b_n$ is expressed by <$b_{16}$, $b_{15}$, $b_{14}$, $b_{13}$, $b_{12}$, $b_{11}$, $b_{10}$, $b_9$, $b_8$, $b_7$, $b_6$, $b_5$, $b_4$, $b_3$, $b_2$, $b_1$>, and 'n' corresponds to the lower 4 bits. Further, the z-sequence $z_m$ is expressed by <$z_{16}$, $z_{15}$, $z_{14}$, $z_{13}$, $z_{12}$, $z_{11}$, $z_{10}$, $z_9$, $z_8$, $z_7$, $z_6$, $z_5$, $z_4$, $z_3$, $z_2$, $z_1$>, and 'm' corresponds to the upper 4 bits.

The output $b_{out}$ from the first MUX 410 and output $z_{out}$ from the second MUX 420 are input to the XOR operation unit 430. Further, a Hadamard sequence $H_m$ (SCHChipCnt [7:0]) is input to the XOR operation unit 430 as the other input. The Hadamard sequence $H_m$ (SCHChipCnt [7:0]) represents a Hadamard sequence corresponding to a current chip count value SCHChipCnt [7:0] and the Hadamard sequence $H_m$ (SCHChipCnt [7:0]) is generated by the Hadamard generator shown in FIG. 3. The XOR operation unit 430 performs a logical XOR operation on '$b_{out}$', '$z_{out}$' and the Hadamard sequence $H_m$ (SCHChipCnt [7:0]). Based on the result of the logical XOR operation, the XOR operation unit 430 outputs a second synchronization code by the unit of 8 bit chips.

An input/output relation in the XOR operation unit 430 is shown in table 5.

TABLE 5

| $b_{out}$ | $z_{out}$ | Hadamard Code | XOR_out |
|---|---|---|---|
| $b_1$ | $z_1$ | $H_m(0)$ | $b_1 \oplus z_1 \oplus H_m(0)$ |
| $b_2$ | $z_1$ | $H_m(0)$ | $b_2 \oplus z_1 \oplus H_m(0)$ |
| $b_3$ | $z_1$ | $H_m(0)$ | $b_3 \oplus z_1 \oplus H_m(0)$ |
| . | . | . | . |
| . | . | . | . |
| $b_{16}$ | $z_1$ | $H_m(0)$ | $b_{16} \oplus z_1 \oplus H_m(0)$ |
| $b_1$ | $z_2$ | $H_m(1)$ | $b_1 \oplus z_2 \oplus H_m(1)$ |
| $b_2$ | $z_2$ | $H_m(1)$ | $b_2 \oplus z_2 \oplus H_m(1)$ |
| . | . | . | . |
| . | . | . | . |
| $b_{16}$ | $z_2$ | $H_m(1)$ | $b_{16} \oplus z_2 \oplus H_m(0)$ |
| $b_1$ | $z_3$ | $H_m(2)$ | $b_1 \oplus z_3 \oplus H_m(2)$ |
| $b_2$ | $z_3$ | $H_m(2)$ | $b_2 \oplus z_3 \oplus H_m(2)$ |
| . | . | . | . |
| . | . | . | . |
| $b_{16}$ | $z_{16}$ | $H_m(255)$ | $b_{16} \oplus z_{16} \oplus H_m(255)$ |

The XOR_out shown in table 5 is a second synchronization code in the unit of chip and the XOR_out may be expressed by equation 1 through generalization.

Also, the aforementioned operation repeats 256 times in response to a generated one 'm' as implied through the description above. As a result of the operation, a second synchronization code of 256 chips, which will be transmitted through one slot, is generated.

In the embodiment of the present invention as described above, 4 bit code index values are used in response to a slot in a particular scrambling code group, thereby reducing a size of a register storing a code index according to each slot. Further, when a data bus structure constructed by 32 bit words is used, 4 bit code index values are used, so that total two words (4 bits×eight slots, 4 bits×seven slots) are used, thereby decreasing access times in operation digital signal processing. Furthermore, separate operators are not used for determining 'm', thereby simplifying a construction of the second synchronization code.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method, for use in a transmitter in a mobile communication system, the mobile communication system having multiple code groups having inherent code indices in response to each of slots, selecting one code group from among the multiple code groups, and generating a second synchronization code corresponding to any one slot from among multiple slots, which are included in the selected code group, the method being performed to determine position information designating a Hadamard code necessary for generating the second synchronization code, the method comprising the steps of:

(1) in response to any one slot, outputting a value, which is obtained by subtracting 1 from a code index included in the selected code group, as a binary bit row; and
    (2) selecting one bit row, which employs the binary bit row as an upper bit and employs a binary code "0000" as a lower bit, as position information which designates the Hadamard code.

2. The method as claimed in claim 1, wherein each code group has inherent code indices which are expressed by 5 bits in response to each of 15 slots, and the binary bit row is expressed by 4 bits.

3. The method as claimed in claim 1, wherein step 1 comprises:

temporarily storing binary bit rows of 4 bits obtained by subtracting 1 from inherent indices corresponding to each of slots included in the selected code group; and
    selecting and outputting a binary bit row corresponding to any one slot selected by a slot count value from among the temporarily stored binary bit rows.

4. The method as claimed in claim 1, further comprising step 3 of generating the Hadamard code through a logical AND operation in the unit of bit with respect to the position information and an 8 bit chip count value selecting one from among 256 sequences, and a logical XOR operation with respect to a row of bits obtained by the logical AND operation.

5. An apparatus, for use in a transmitter in a mobile communication system, the mobile communication system having multiple code groups which have inherent code indices in response to each of slots, selecting one code group from among the multiple code groups and generating a second synchronization code corresponding to any one slot from among multiple slots which is included in the selected code group, the apparatus being operable to determine position information designating a Hadamard code necessary for generating the second synchronization code, the apparatus comprising:
- a register for temporarily storing binary bit rows of 4 bits obtained by subtracting 1 from inherent indices corresponding to slots included in the selected code group;
- a multiplexer for selecting and outputting any one binary bit row from among the temporarily stored binary bit rows by in accordance with a slot count value; and
- a buffer for outputting one bit row, which employs the binary bit row from the multiplexer as an upper bit and employs a binary code "0000" as a lower bit, as position information which designates the Hadamard code.

6. The apparatus claimed in claim 5, wherein each code group has inherent code indices which are expressed by 5 bits in response to each of 15 slots and the binary bit row is expressed by 4 bits.

7. The apparatus claimed in claim 5, further comprises:
- an AND operation unit for receiving position information from the buffer and an 8 bit chip count value selecting one from among 256 sequences, and performing a logical AND operation on the position information and the chip count value by the unit of bit; and
- an XOR operation unit for performing a logical XOR operation on a row of bits obtained by the logical AND operation and outputting the Hadamard code.

8. A method, for use in a transmitter in a mobile communication system, the mobile communication system having multiple code groups which have inherent code indices in response to slots, selecting one code group from among the multiple code groups and generating a second synchronization code corresponding to any one slot from among multiple slots which included in the selected code group, the method being performed to generate a Hadamard code necessary for generating the second synchronization code, the method comprising the steps of:
- (1) in response to any one slot, outputting a value, which is obtained by subtracting 1 from a code index included in the selected code group, as a binary bit row;
- (2) selecting one bit row, which employs the binary bit row as an upper bit and employs a binary code "0000" as a lower bit, as position information which designates the Hadamard code; and
- (3) generating the Hadamard code through a logical AND operation in the unit of bit with respect to the position information and an 8 bit chip count value selecting one from among 256 sequences; and a logical XOR operation with respect to a row of bits obtained by the logical AND operation.

9. The method as claimed in claim 8, wherein each code group has inherent code indices which are expressed by 5 bits in response to each of 15 slots, and the binary bit row is expressed by 4 bits.

10. The method as claimed in claim 8, wherein step 1 comprises:
- temporarily storing binary bit rows of 4 bits obtained by subtracting 1 from inherent indices corresponding to each of slots included in the selected code group; and
- selecting and outputting a binary bit row corresponding to any one slot selected by a slot count value from among the temporarily stored binary bit rows.

* * * * *